United States Patent
Gibb et al.

(10) Patent No.: US 12,276,360 B2
(45) Date of Patent: Apr. 15, 2025

(54) COMBINATION SEALING MEMBER AND PIPE COUPLINGS

(71) Applicant: Victaulic Company, Easton, PA (US)

(72) Inventors: John Gibb, Alliston (CA); Douglas R. Dole, Whitehouse Station, NJ (US); Michael V. Porter, Easton, PA (US)

(73) Assignee: Victaulic Company, Easton, PA (US)

( * ) Notice: Subject to any disclaimer, the term of this patent is extended or adjusted under 35 U.S.C. 154(b) by 0 days.

(21) Appl. No.: 18/484,389

(22) Filed: Oct. 10, 2023

(65) Prior Publication Data

US 2024/0035597 A1 Feb. 1, 2024

Related U.S. Application Data

(63) Continuation of application No. 17/214,973, filed on Mar. 29, 2021, now abandoned, which is a continuation of application No. 15/662,376, filed on Jul. 28, 2017, now Pat. No. 10,962,152, which is a continuation-in-part of application No. 14/277,271, filed on May 14, 2014, now Pat. No. 9,726,310, which is a continuation of application No. 11/867,146, filed on Oct. 4, 2007, now Pat. No. 8,733,799, which is a continuation of application No. 11/128,728, filed on May 13, 2005, now abandoned.

(60) Provisional application No. 60/571,596, filed on May 14, 2004.

(51) Int. Cl.
| | | |
|---|---|---|
| *F16L 17/04* | (2006.01) | |
| *F16L 21/00* | (2006.01) | |
| *F16L 21/02* | (2006.01) | |
| *F16L 21/06* | (2006.01) | |
| *F16L 23/08* | (2006.01) | |
| *F16L 23/18* | (2006.01) | |
| *F16L 25/14* | (2006.01) | |

(52) U.S. Cl.
CPC ............... *F16L 21/02* (2013.01); *F16L 17/04* (2013.01); *F16L 21/005* (2013.01); *F16L 21/065* (2013.01); *F16L 23/08* (2013.01); *F16L 23/18* (2013.01); *F16L 25/14* (2013.01); *Y10T 29/53987* (2015.01)

(58) Field of Classification Search
CPC ......... F16L 17/04; F16L 17/03; F16L 17/035; F16L 21/065; F16L 23/08; F16L 23/10; F16L 23/04
See application file for complete search history.

(56) References Cited

U.S. PATENT DOCUMENTS 3,680,894 A * 8/1972 Young ..................... F16L 17/04
  285/112
6,139,069 A * 10/2000 Radzik .................... F16L 23/04
  285/112

* cited by examiner

*Primary Examiner* — Aaron M Dunwoody
(74) *Attorney, Agent, or Firm* — Ballard Spahr LLP

(57) ABSTRACT

First and second pipe elements are joined end to end by a coupling. The first and second pipe elements have a circumferential groove at an end, and each of the grooves has a floor. A plurality of segments, each having oppositely disposed ends, and a respective connection member positioned at each end, form the coupling. A first end of each segment is connected to a second end of another of the segments such that said segments surround a central space for receiving the second pipe element.

13 Claims, 8 Drawing Sheets

COMBINATION SEALING MEMBER AND PIPE COUPLINGS

CROSS-REFERENCE TO RELATED APPLICATIONS

This application is a continuation of U.S. application Ser. No. 17/214,973, filed Mar. 29, 2021, which application is a continuation of U.S. application Ser. No. 15/662,376, filed Jul. 28, 2017, now U.S. Pat. No. 10,962,152, issued Mar. 30, 2021, which application is a continuation in part of U.S. application Ser. No. 14/277,271, filed May 14, 2014, now U.S. Pat. No. 9,726,310, issued Aug. 8, 2017, which is a continuation of U.S. application Ser. No. 11/867,146, filed Oct. 4, 2007, now U.S. Pat. No. 8,733,799, issued May 27, 2014, which is a continuation of U.S. application Ser. No. 11/128,728, filed May 13, 2005, now abandoned, which claims priority to U.S. Provisional Application No. 60/571,596, filed May 14, 2004, all aforementioned applications being hereby incorporated by reference herein.

FIELD OF THE INVENTION

This invention relates to pre-assembled mechanical pipe couplings for joining pipe elements.

BACKGROUND OF THE INVENTION

Mechanical couplings for joining pipe elements together end-to-end comprise interconnectable segments that are positionable circumferentially surrounding the end portions of co-axially aligned pipe elements. The term "pipe element" is used herein to describe any pipe-like item or component having a pipe like form. Pipe elements include pipe stock, pipe fittings such as elbows, caps and tees as well as fluid control components such as valves, reducers, strainers, restrictors, pressure regulators and the like.

Each mechanical coupling segment comprises a housing having arcuate surfaces which project radially inwardly from the housing and engage plain end pipe elements or circumferential grooves that extend around each of the pipe elements to be joined. Engagement between the arcuate surfaces and the pipe elements provides mechanical restraint to the joint and ensures that the pipe elements remain coupled even under high internal pressure and/or external forces. The housings define an annular channel that receives a sealing member, typically an elastomeric ring which engages the ends of each pipe element and cooperates with the segments to provide a fluid tight seal. The segments have connection members, typically in the form of lugs which project outwardly from the housings. The lugs are adapted to receive fasteners, such as nuts and bolts, which are adjustably tightenable to draw the segments toward one another.

To ensure a good fit between the couplings and the pipe elements, the arcuate surfaces on prior art couplings have a radius of curvature that is substantially matched to the radius of curvature of the outer surface of the pipe element that it is intended to engage. For couplings used with grooved pipe elements, the radii of curvature of the arcuate surfaces are smaller than the radii of curvature of the outer surfaces of the pipe elements outside of the grooves so that the arcuate surfaces fit within and engage the grooves properly.

This geometrical relation between the arcuate surfaces of the couplings and the outer surfaces of the pipe elements in prior art couplings results in a tedious and time consuming installation process when mechanical couplings are used. Typically, the coupling is received by the technician with the segments bolted together and the ring seal captured within the segments' channels. The technician first disassembles the coupling by unbolting it, removes the ring seal, lubricates it (if not pre-lubricated) and places it around the ends of the pipe elements to be joined. Installation of the ring seal requires that it be lubricated and stretched to accommodate the pipe elements, an often difficult and messy task, as the ring seal is usually stiff and the lubrication makes manual manipulation of the seal difficult. With the ring seal in place on both pipe elements, the segments are then placed one at a time straddling the ends of the pipe elements and capturing the ring seal against them. During placement, the segments engage the seal, the arcuate surfaces are aligned with the grooves, the bolts are inserted through the lugs, the nuts are threaded onto the bolts and tightened, drawing the coupling segments toward one another, compressing the seal and engaging the arcuate surface within the grooves.

As evident from the previous description, installation of mechanical pipe couplings according to the prior art requires that the technician typically handle at least seven individual piece parts (and more when the coupling has more than two segments), and must totally disassemble and reassemble the coupling. Significant time, effort and expense would be saved if the technician could install a mechanical pipe coupling without first totally disassembling it and then reassembling it, piece by piece.

SUMMARY OF THE INVENTION

The invention concerns, in combination, first and second pipe elements and a coupling for joining the pipe elements end to end. In an example embodiment the first and second pipe elements each having a circumferential groove at an end of the pipe element. Each of the grooves has a floor. By way of an example, the coupling comprises a plurality of segments. Each segment has oppositely disposed ends, and a respective connection member positioned at each the end. A first end of each segment is connected to a second end of another of the segments such that the segments surround a central space for receiving the second pipe element. A pair of arcuate projections are positioned on opposite sides of and extend along each of the segments. An arcuate surface is positioned on each of the projections. Each arcuate surface is engageable with the floor of the groove in one of the pipe elements. A channel is positioned between the projections on each of the segments. A seal is received within the channel. The seal has an outer surface sized to support the segments in spaced apart relation to provide clearance about a circumference of the second pipe element, including where measured adjacent to the connection members. The clearance is sufficient to permit insertion of the second pipe element into the central space. The seal has an inner surface sized to receive the second pipe element. At least one of the connection members is adjustably tightenable for drawing each arcuate surface into engagement with one of the floors upon tightening of the at least one connection member.

Further by way of Example, each projection extends between the oppositely disposed ends of the segments. A specific example may further comprise a cut-out located at each end of each arcuate surface. In a particular example embodiment, each projection subtends an angle less than 180°.

Additionally by way of example, each one of the segments may be deformable so as to substantially conform a curvature of each one of the arcuate surfaces to a curvature of one of the floors upon tightening of the at least one connection member. In an example embodiment, two of the connection members are adjustably tightenable. Further by way of example, the coupling may comprise at most two of the segments. In another example embodiment, the coupling comprises three segments.

In an example embodiment, the seal has sufficient stiffness to maintain the segments in the preassembled state during shipping and through handling of the coupling during insertion of the second pipe element into the central space. In a particular example embodiment, the end of the first pipe element is disposed in the central space. Further by way of example, the segments surround the central space for receiving the first pipe element. In an example embodiment, the outer surface of the seal is sized to support the segments in spaced apart relation to provide clearance about a circumference of the first pipe element, including where measured adjacent to the connection members. In this example the clearance is sufficient to permit insertion of the first pipe element into the central space. The seal has an inner surface sized to receive the first pipe element.

The invention further encompasses, in combination, first and second pipe elements and a coupling for joining the pipe elements end to end. In an example embodiment the first and second pipe elements each has a circumferential groove at an end thereof. Each of the grooves has a floor. In an example embodiment the coupling comprises a plurality of segments, each having oppositely disposed ends and a respective connection member positioned at each end. By way of example, a first end of each segment is connected to a second end of another of the segments such that the segments surround a central space for receiving the second pipe element. A pair of arcuate projections is positioned on opposite sides of and extending between the oppositely disposed ends of each of the segments. An arcuate surface is positioned on each of the projections. Each arcuate surface is engageable with the floor of the groove in one of the pipe elements. A cut-out is located at each end of each the arcuate surface. A channel is positioned between the projections on each of the segments. A seal is received within the channel. The seal has an outer surface sized to support the segments in spaced apart relation to provide clearance about a circumference of the second pipe element including where measured adjacent to the connection members. The clearance is sufficient to permit insertion of the second pipe element into the central space. The seal has an inner surface sized to receive the second pipe element. At least one of the connection members is adjustably tightenable for drawing each arcuate surface into engagement with one of the floors.

In an example embodiment, each projection subtends an angle less than 180°. Further by way of example each one of the segments is deformable so as to substantially conform a curvature of each one of the arcuate surfaces to a curvature of one of the floors upon tightening of the at least one connection member. In a particular example embodiment, two of the connection members are adjustably tightenable. Further by way of example, the coupling may comprise at most two of the segments. In a specific example embodiment, the coupling comprises three of the segments.

In a particular example embodiment the seal has sufficient stiffness to maintain the segments in the preassembled state during shipping and through handling of the coupling during insertion of the second pipe element into the central space.

DETAILED DESCRIPTION

Figure 1:
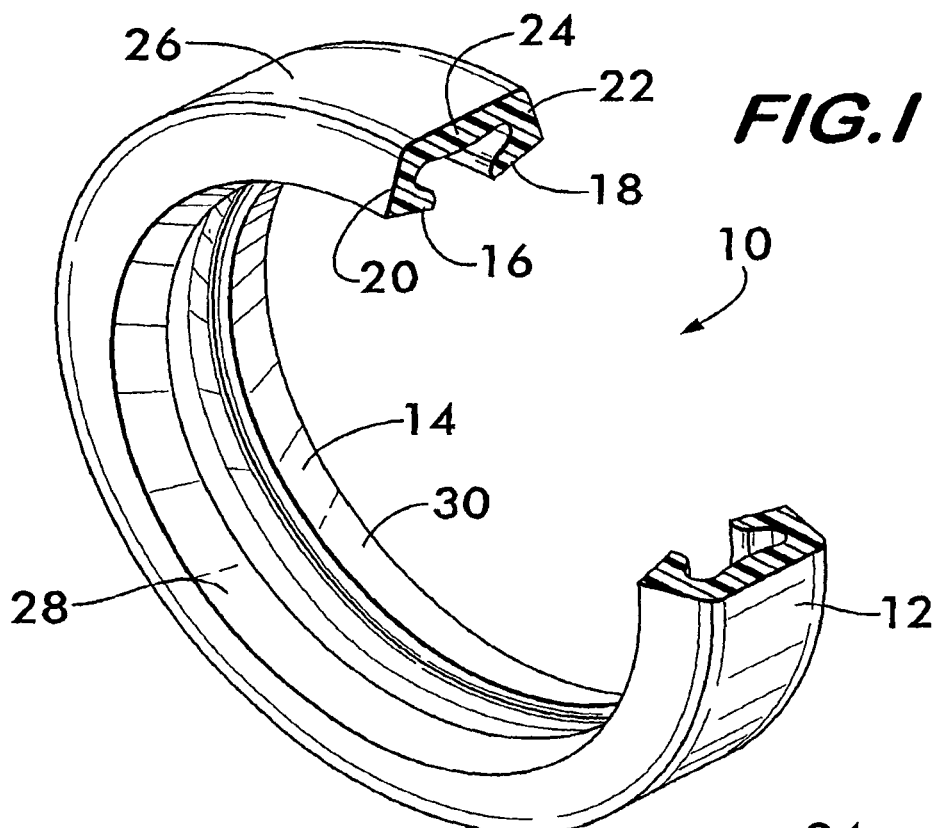
FIG. 1 is an isometric view, partially cut away, of an embodiment of a sealing member used in the method according to the invention.

FIG. 1 shows a perspective view of a sealing member 10 according to the invention. Sealing member 10 comprises a flexible, resilient ring 12 having a ring inner surface 14. Preferably, ring inner surface 14 is formed of a pair of lips 16 and 18 that are attached to respective sidewalls 20 and 22 that extend from a backwall 24. Backwall 24 provides a ring outer surface 26 that extends circumferentially around the ring. The sidewalls and the lips are positioned in spaced apart relation on opposite sides of the ring 12. Lips 16 and 18 project substantially inwardly toward one another and have respective conical surfaces 28 and 30 that slope inwardly toward the center of ring 12 to act as a lead-in to guide pipe elements into engagement with the sealing member as described below.

Figure 2:
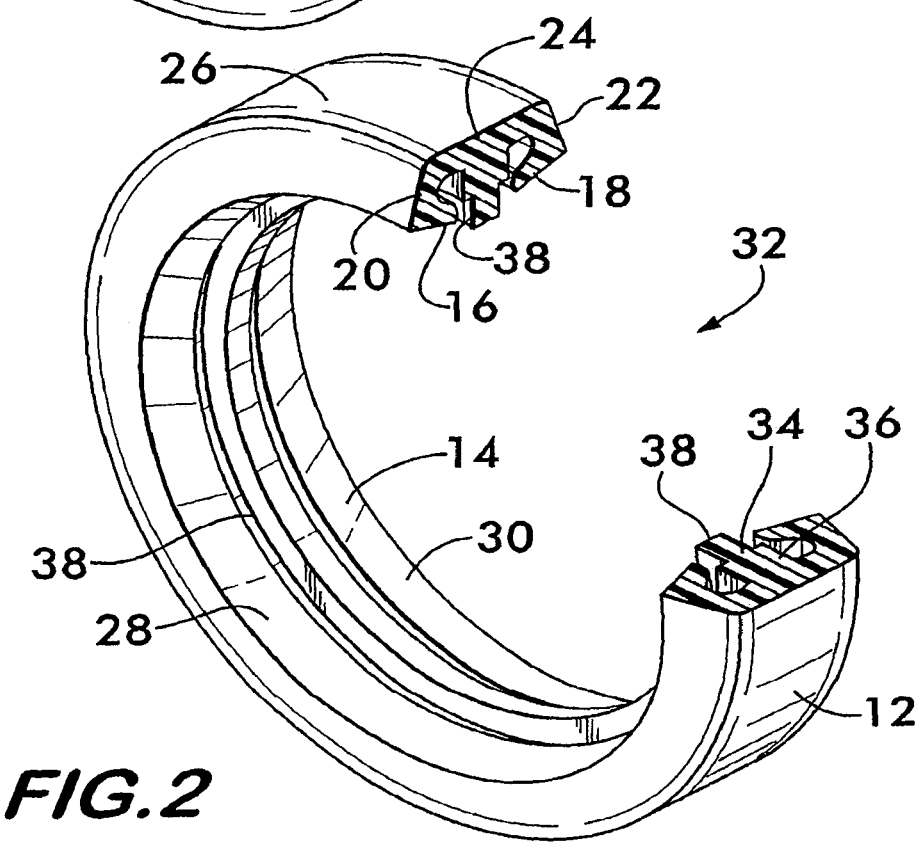
FIG. 2 is an isometric view, partially cut away, of another embodiment of a sealing member used in the method according to the invention.
Figure 2A:
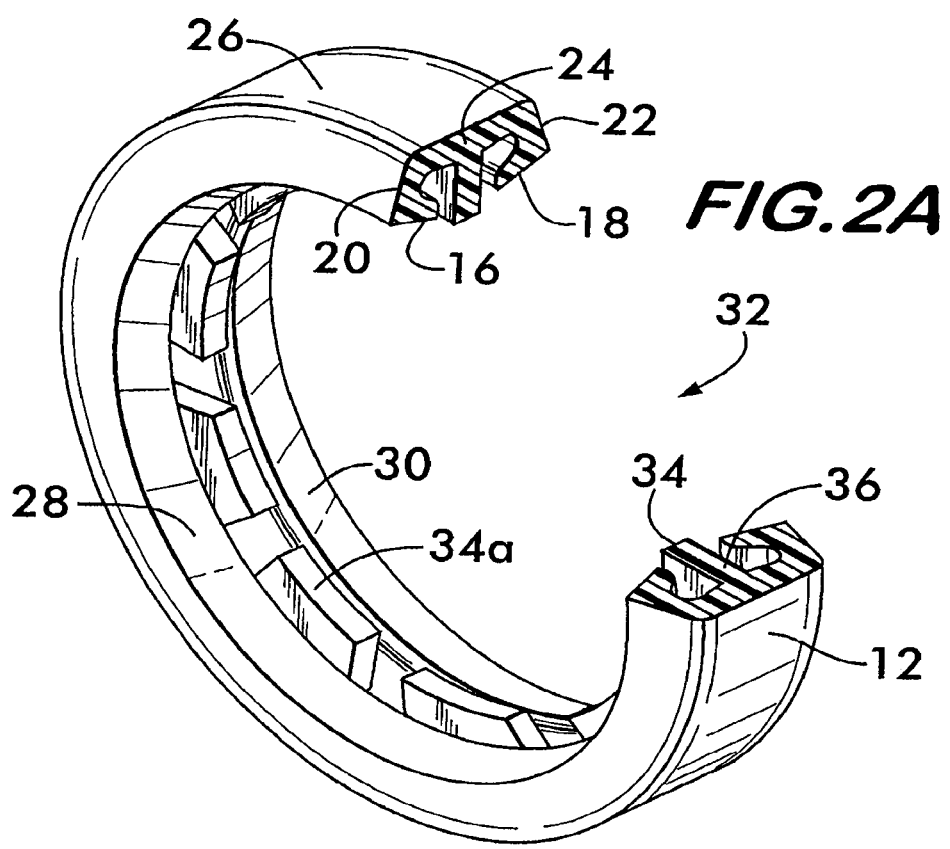
FIG. 2A is an isometric view, partially cut away, of another embodiment of a sealing member used in the method according to the invention.

In a preferred embodiment 32 of the sealing member, shown in FIG. 2, ring 12 further includes a tongue 34. Tongue 34 is positioned between lips 16 and 18 and has a root portion 36 that is attached to the backwall 24 opposite to the ring outer surface 26. Tongue 34 projects substantially radially inwardly from the backwall 24 and extends circumferentially around ring 12. The tongue may be substantially continuous, as shown in FIG. 2, or may comprise a plurality of sections 34a in spaced apart relation to one another around the ring as shown in FIG. 2A.

Figure 3:
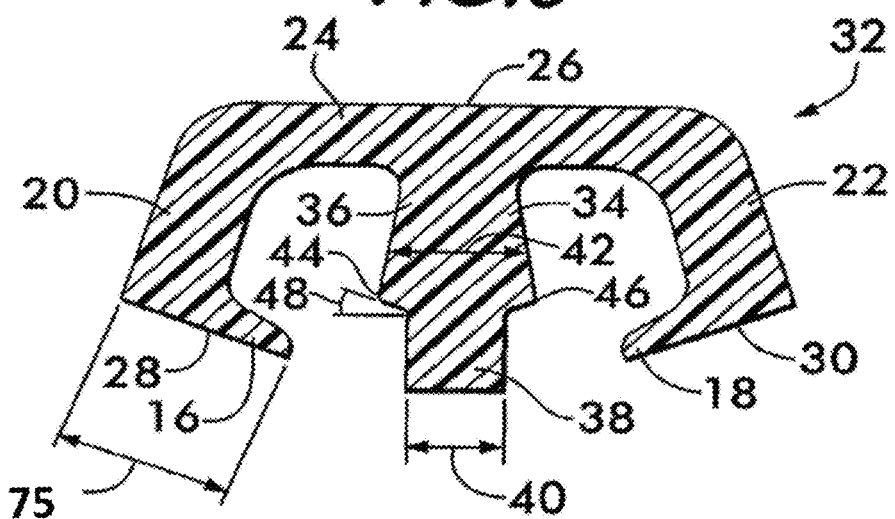
FIG. 3 is a cross sectional view of a sealing member embodiment used in the method according to the invention.

In a preferred embodiment 32, best shown in FIG. 3, tongue 34 has a tip portion 38 extending from the root portion 36. The thickness 40 of tip portion 38 is smaller than the thickness 42 of the root portion 36. This dimensional relation results in a pair of shoulders 44 and 46 being formed between the root and tip portions. Preferably, the shoulders 44 and 46 have conical profile shapes for engaging and guiding pipe elements as described below. Cone angles 48 up to about 30° are advantageous for the functioning of the tongue 34.

Figure 4:
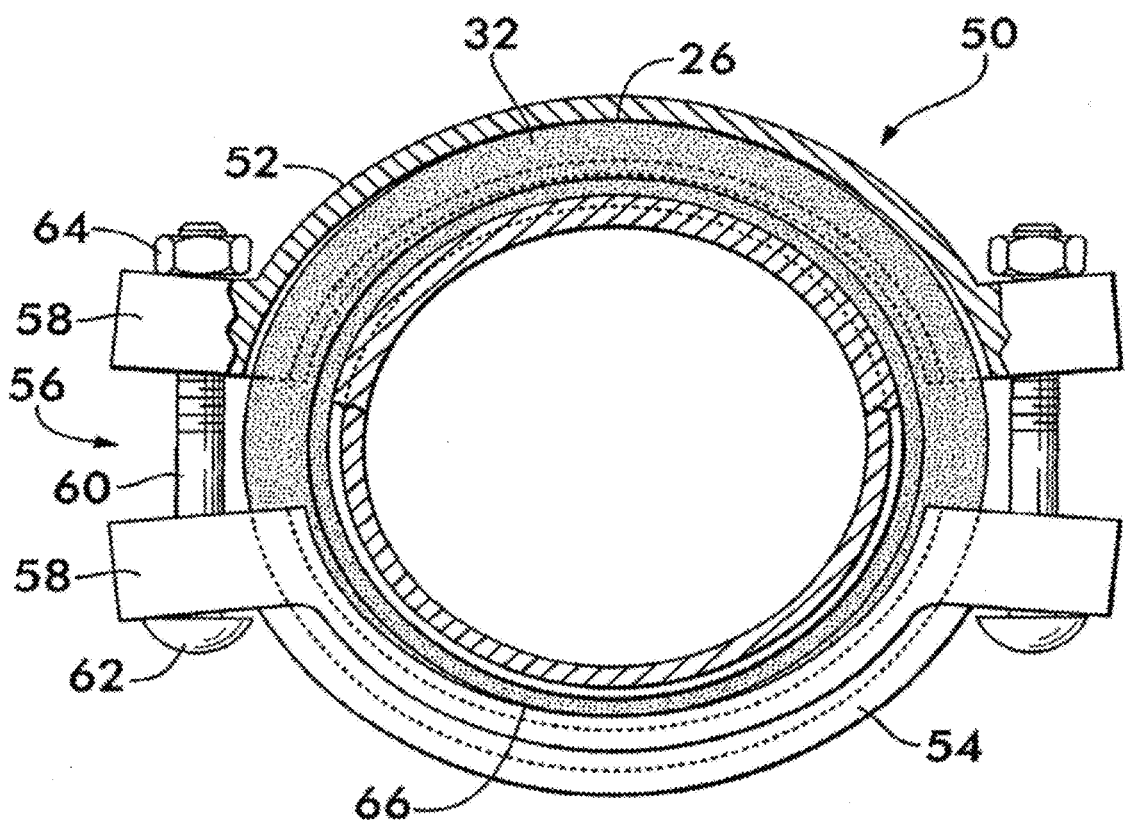
FIG. 4 is an axial cross sectional view of a pre-assembled coupling prepared according to the method of the invention.

As shown in FIG. 4, sealing members such as 10 and 32 are used with mechanical couplings 50 for securing pipe elements together in end to end relation, the sealing members ensuring a fluid tight joint. (Hereinafter, sealing member embodiment 32 is described, it being understood that the description applies to all sealing member embodiments according to the invention.)

Coupling 50 comprises a plurality of coupling segments, in this example, two segments 52 and 54. The coupling segments are connected to one another by adjustably tightenable connection members 56, which preferably comprise lugs 58 that extend outwardly from the ends of each segment and are positioned in facing relation to one another to receive fasteners 60, such as bolts 62 and nuts 64. Each segment also has a pair of arcuate surfaces 66 that are positioned in spaced relation to one another and face inwardly for engagement with the outer surfaces of respective pipe elements as described below.

Figures 5, 6:
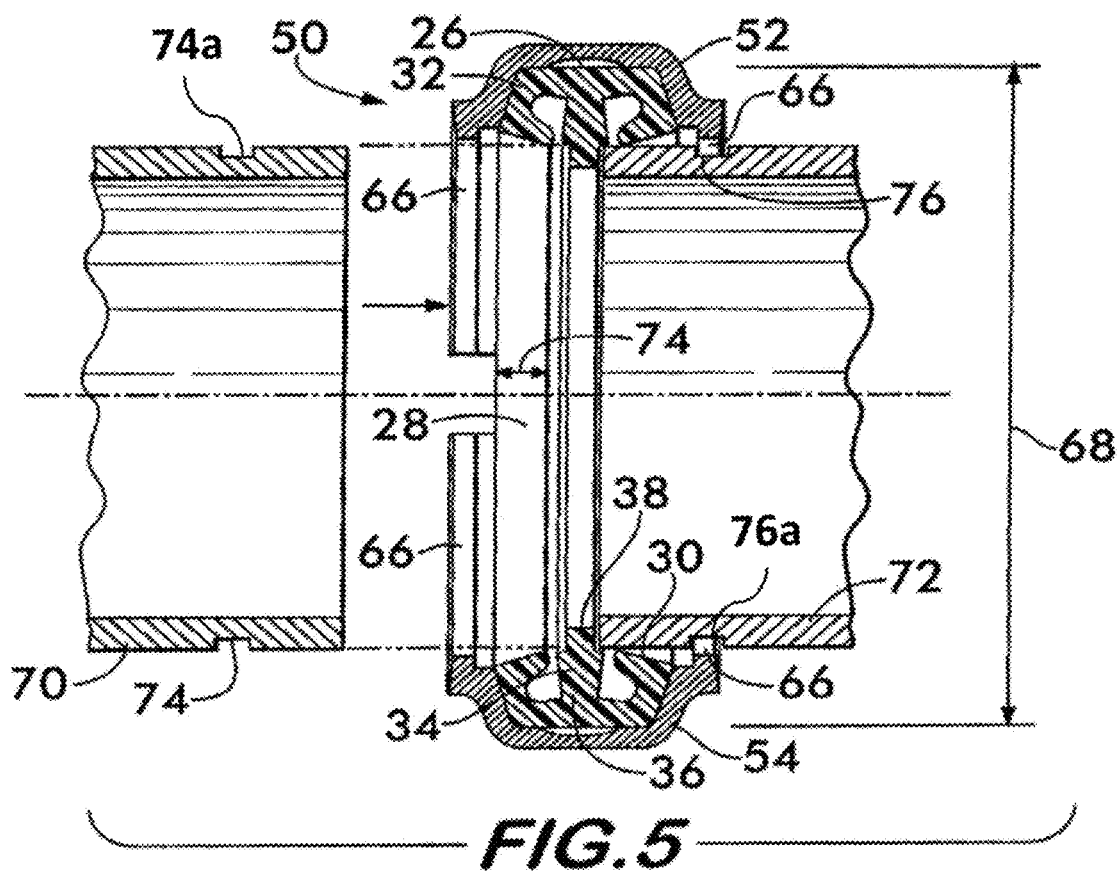
FIGS. 5 and 6 are longitudinal sectional views of the coupling shown in FIG. 4.
Figure 7:
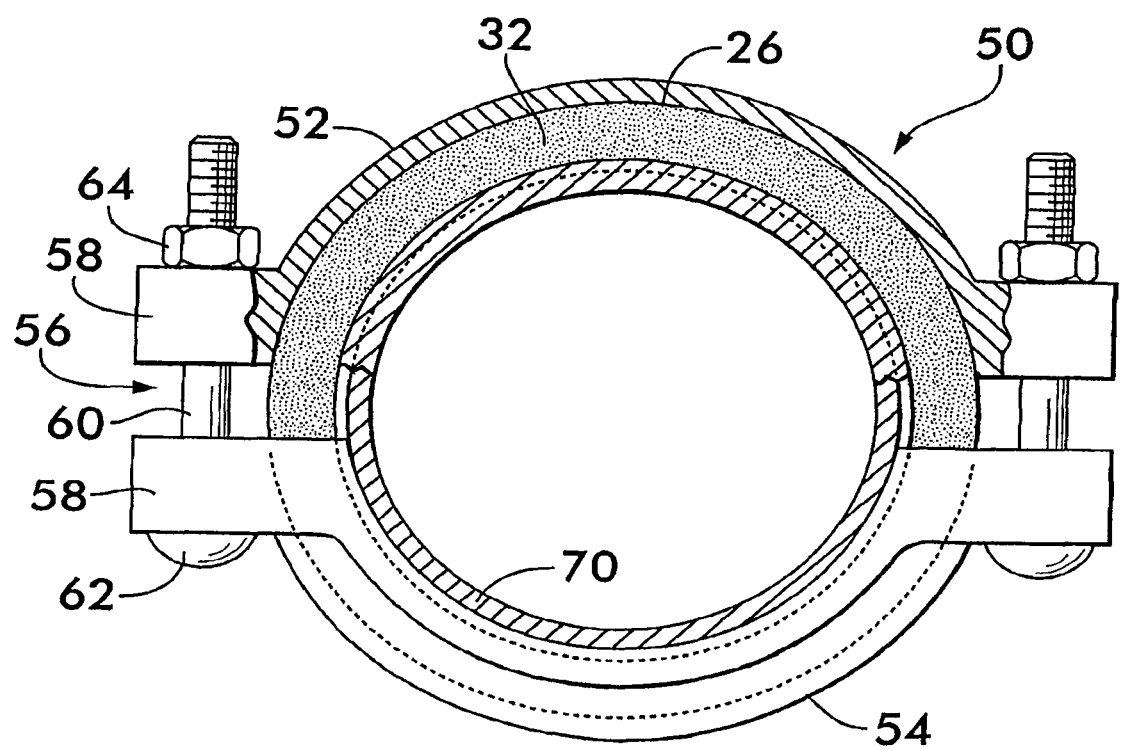
FIG. 7 is an axial cross sectional view of the coupling shown in FIG. 4.

FIG. 4 further shows the coupling 50 in a pre-assembled state, with segments 52 and 54 supported on the ring outer surface 26, the segments being held together in the pre-assembled state by the fasteners 60. The coupling 50 is pre-assembled under controlled conditions at the manufacturing facility and arrives on site in the pre-assembled state, ready for immediate use. As shown in FIG. 5, sealing member 32 is designed so that the ring outer surface 26 has a diameter 68 sized to maintain the segments 52 and 54 in spaced relation with sufficient clearance to allow pipe elements 70 and 72 to be inserted between the segments 52 and 54 without disassembling the coupling. Use of seals according to the invention thus provides significant advantage in reducing the labor required for assembly of the pipe joint as the coupling does not require total or even partial disassembly prior to the installation. Sealing member 32 also has sufficient stiffness to maintain the coupling segments in spaced apart relation through shipping and handling during installation, but is resilient and flexible, allowing it to deform as required when the fasteners 60 are tightened to draw the coupling segments 52 and 54 toward one another and engage the coupling arcuate surfaces 66 with the pipe elements as shown in FIGS. 6 and 7 to secure the pipe elements 70 and 72 in end to end relation and provide a fluid tight joint.

Note that the conical surfaces 28 and 30 of lips 16 and 18 each have a width 75 (see FIG. 3) that is sized so that the pipe elements engage the lips on the conical surfaces as they are inserted into coupling 50 (see FIG. 5). This conical lip geometry facilitates assembly of the pipe joint with the pre-assembled coupling. The lips serve as a lead in to guide the pipe elements into proper engagement with the seal, and also eliminate the need to remove the seal from the coupling and manually stretch and deform it to enable it to receive the pipe elements, as must be done for prior art seals.

Tongue 34 also enhances the ability to quickly and conveniently install pipe elements into the pre-assembled coupling 50. The conical profile of shoulders 44 and 46 further serves as a lead-in to guide the pipe elements into proper engagement with the sealing member 32. The shoulders 44 and 46 engage the ends of the pipe elements and limit the tongue's extension into the bore of the pipe elements where it might impede fluid flow and increase the head loss. Head loss due to resistance in joints becomes significant for long pipe runs having many joints, and is to be avoided. The tongue itself further serves as a stop to align the arcuate surfaces 66 of segments 52 and 54 with a desired target on the outer surface of the pipe elements, in the example shown in FIGS. 5 and 6, the respective floors 74*a* and 76*a* of circumferential grooves 74 and 76. Engagement between the grooves and the arcuate surfaces provide mechanical restraint to secure the pipe elements to the coupling.

Figure 8:
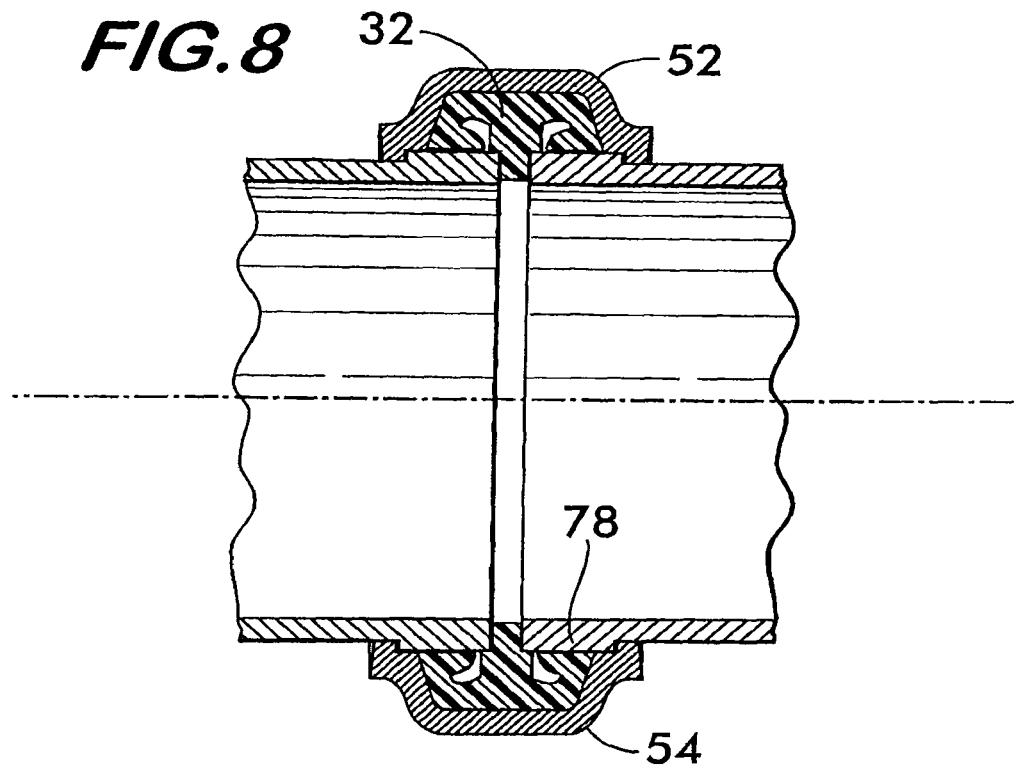
FIGS. 8 and 9 are longitudinal sectional views of pipe joints using sealing members according to the invention.
Figure 9:
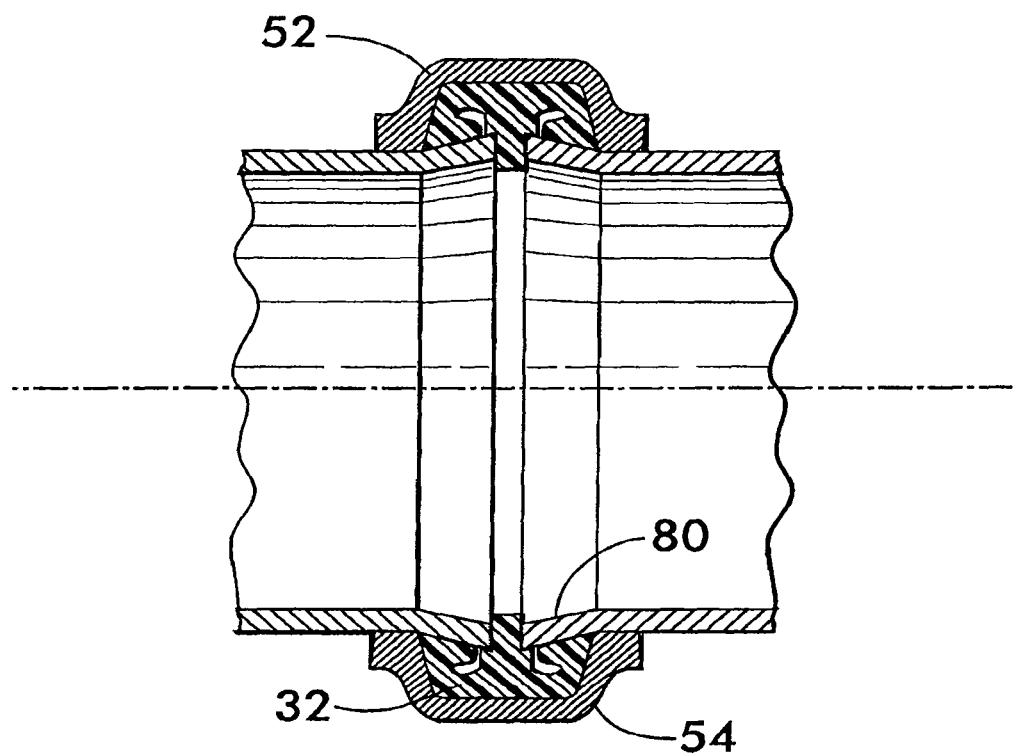

Virtually any type of pipe element will benefit from the use of seals according to the invention. If plain end pipe elements are used (not shown), the target may be witness marks formed on the outer surface to indicate proper engagement depth between pipe element and coupling. As shown in FIGS. 8 and 9, pipe elements having shoulders 78 (FIG. 8) or pipe elements having flared ends 80 (FIG. 9) may be used with the sealing member according to the invention, the sealing member being readily geometrically adaptable to receive the various types of pipe elements.

Sealing members according to the invention may also be used with any type of multi-segment coupling where a seal is used to maintain separation between the segments in a pre-assembled state. The couplings themselves may have enhancements that provide additional clearance for insertion of the pipe elements, allowing the segments to be closer to one another in the pre-assembled state and still permit direct insertion of the pipe elements without any disassembly. To this end, the coupling shown in FIG. 4 is deformable as shown by a comparison of FIGS. 4 and 7. In the undeformed state, the arcuate surfaces 66 have a greater radius of curvature than the pipe elements that they are joining, and the surfaces 66 also subtend an arc of less than 180°. This geometry provides clearance at the 3 o'clock and 9 o'clock positions on the coupling (for a two segment coupling) allowing pipe element insertion. The coupling segments are deformed by tightening fasteners 60, which draw the segments 52 and 54 toward each other and force the arcuate surfaces 66 to engage the pipe elements and conform to its radius of curvature.

Figure 10:
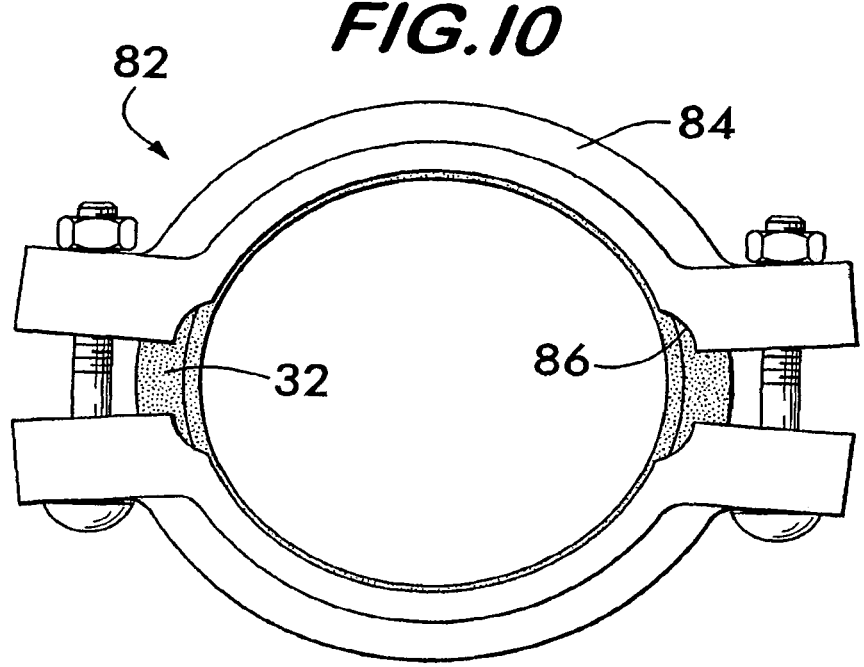
FIGS. 10 and 11 are axial cross sectional views of pre-assembled couplings prepared according to the method of the invention.
Figure 11:
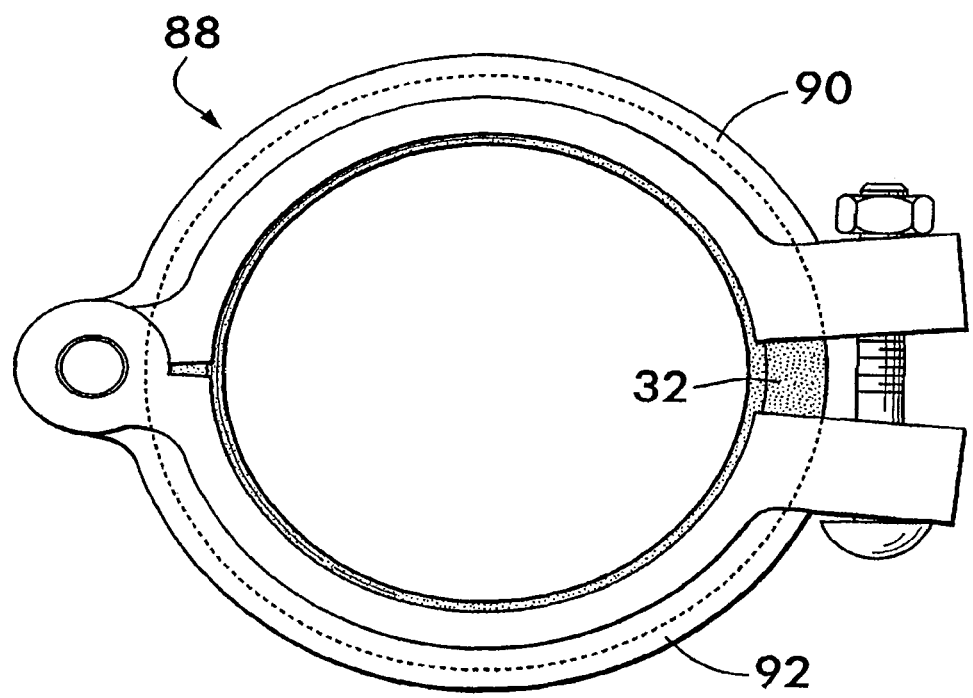
Figure 12:
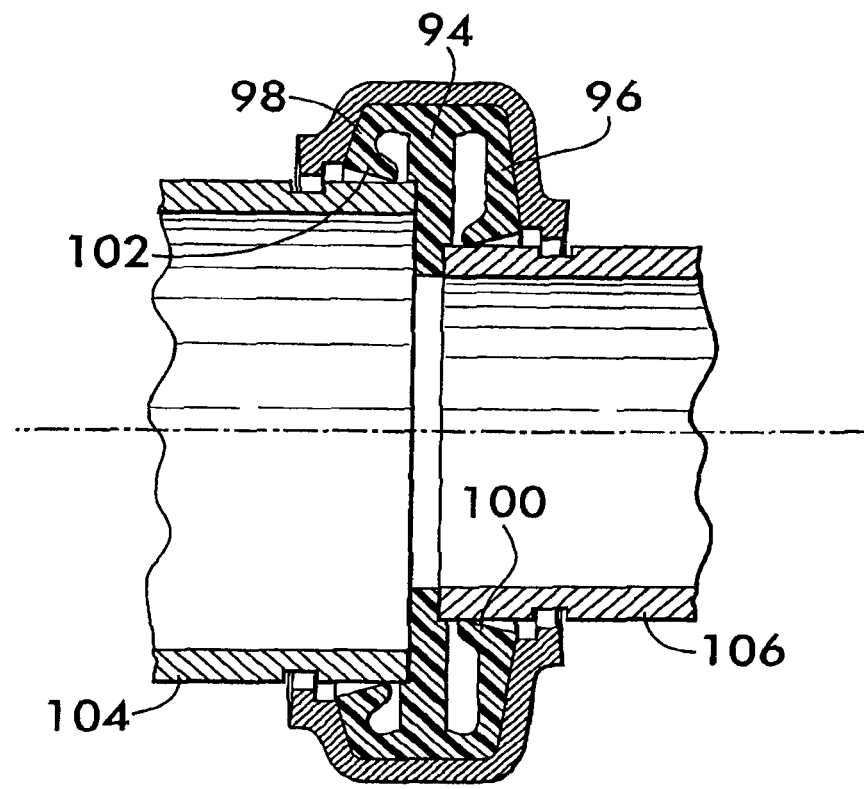
FIG. 12 is a longitudinal sectional view of an embodiment of a sealing member used in the method according to the invention.

FIG. 10 illustrates a pipe coupling 82 having segments 84 with cut-outs 86 at opposite ends of the arcuate surfaces 66. The cut-outs provide the desired clearance enhancement for the coupling. FIG. 11 shows a hinged coupling 88 wherein a sealing member 32 is used to maintain the segments 90 and 92 open to permit pipe element insertion. In FIG. 12 the sealing member 94 has one sidewall 96 that is wider than its other sidewall 98. This geometry positions the lip 100 attached to sidewall 96 at a smaller diameter than lip 102 attached to sidewall 98. The different diameter lips allow the seal to be used to couple pipe elements 104 and 106 having different diameters.

Sealing members according to the invention used with multi-segment couplings provide a significant advantage in assembly of pipe joints because they permit the couplings to be maintained in spaced relation in a pre-assembled state that facilitates assembly of the joint without the need to first disassemble the couplings.

What is claimed is:

1. In combination, first and second pipe elements and a coupling for joining said pipe elements end to end, said first and second pipe elements each having circumferential grooves at opposite ends, each of said grooves having a floor, said coupling comprising:
    a plurality of segments, each having oppositely disposed ends, and a respective connection member positioned at each said end, a first end of each said segment being connected to a second end of another of said segments such that said segments surround a central space for receiving said pipe elements;
    a pair of arcuate projections positioned on opposite sides of and extending along each of said segments;
    an arcuate surface positioned on each of said projections, each said arcuate surface being engageable with said floor of said groove in one of said pipe elements;
    a channel positioned between said projections on each of said segments;
    a seal received within said channel, said seal comprising a backwall forming a ring, first and second sidewalls positioned in spaced apart relation on opposite sides of said ring, and a tongue attached to said backwall and extending circumferentially around said ring, said tongue being positioned between said first and second sidewalls and projecting substantially radially inwardly from said backwall to be positionable between said ends of said pipe elements, said tongue comprising a plurality of sections positioned in spaced apart relation around said ring, wherein a gap extending radially inwardly from said backwall is positioned between adjacent sections of said plurality of sections; wherein at least one of said connection members is adjustably tightenable for drawing each said arcuate surface into engagement with one of said floors upon tightening of said at least one connection member.

2. The combination according to claim 1, wherein each said projection extends between said oppositely disposed ends of said segments.

3. The combination according to claim 2, further comprising a cut-out located at each end of each said arcuate surface.

4. The combination according to claim 1, wherein each said projection subtends an angle less than 180°.

5. The combination according to claim 1, wherein each one of said segments is deformable so as to substantially conform a curvature of each one of said arcuate surfaces to a curvature of one of said floors upon tightening of said at least one connection member.

6. The combination according to claim 1, wherein two of said connection members are adjustably tightenable.

7. The combination according to claim 1, wherein said coupling comprises at most two of said segments.

8. The combination according to claim 1, wherein said plurality of sections are positioned in circumferentially spaced apart relation around said ring, said plurality of sections being engageable with said ends of said pipe elements.

9. In combination, first and second pipe elements and a coupling for joining said pipe elements end to end, said first and second pipe elements each having circumferential grooves at opposite ends, each of said grooves having a floor, said coupling comprising:

a plurality of segments, each having oppositely disposed ends, and a respective connection member positioned at each said end, a first end of each said segment being connected to a second end of another of said segments such that said segments surround a central space for receiving said pipe elements;

a pair of arcuate projections positioned on opposite sides of and extending between said oppositely disposed ends of each of said segments;

an arcuate surface positioned on each of said projections, each said arcuate surface being engageable with said floor of said groove in one of said pipe elements, a cut-out being located at each end of each said arcuate surface;

a channel positioned between said projections on each of said segments;

a seal received within said channel, said seal comprising a backwall forming a ring, first and second sidewalls positioned in spaced apart relation on opposite sides of said ring, and a tongue attached to said backwall and extending circumferentially around said ring, said tongue being positioned between said first and second sidewalls and projecting substantially radially inwardly, said tongue comprising a plurality of sections positioned in spaced apart relation around said ring; wherein at least one of said connection members is adjustably tightenable for drawing each said arcuate surface into engagement with one of said floors.

10. The combination according to claim 9, wherein each said projection subtends an angle less than 180°.

11. The combination according to claim 9, wherein each one of said segments is deformable so as to substantially conform a curvature of each one of said arcuate surfaces to a curvature of one of said floors upon tightening of said at least one connection member.

12. The combination according to claim 9, wherein two of said connection members are adjustably tightenable.

13. The combination according to claim 9, wherein said coupling comprises at most two of said segments.

* * * * *